(12) United States Patent
Kuritsyn et al.

(10) Patent No.: US 9,918,375 B2
(45) Date of Patent: Mar. 13, 2018

(54) PLASMA BASED LIGHT SOURCE HAVING A TARGET MATERIAL COATED ON A CYLINDRICALLY-SYMMETRIC ELEMENT

(71) Applicant: KLA-Tencor Corporation, Milpitas, CA (US)

(72) Inventors: Alexey Kuritsyn, San Jose, CA (US); Ye Liu, San Jose, CA (US); Oleg Khodykin, San Diego, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/268,793

(22) Filed: Sep. 19, 2016

(65) Prior Publication Data

US 2017/0142818 A1 May 18, 2017

Related U.S. Application Data

(60) Provisional application No. 62/255,907, filed on Nov. 16, 2015.

(51) Int. Cl.
*H05G 2/00* (2006.01)
*G03F 7/20* (2006.01)
*G02F 1/03* (2006.01)

(52) U.S. Cl.
CPC .......... *H05G 2/008* (2013.01); *G02F 1/0327* (2013.01); *G02F 2203/26* (2013.01)

(58) Field of Classification Search
CPC ........ H05G 2/008; H05G 2/003; H05G 2/005; H05G 2/006; H05G 1/00; G03F 7/70033;
(Continued)

(56) References Cited

U.S. PATENT DOCUMENTS 4,961,195 A * 10/1990 Skupsky .................. G02F 1/37
359/328
5,565,677 A 10/1996 Wexler
(Continued)

FOREIGN PATENT DOCUMENTS

| WO | 2014161698 A1 | 10/2014 |
| WO | 2014168519 A1 | 10/2014 |
| WO | 2015055374 A1 | 4/2015 |

OTHER PUBLICATIONS

Amano, Laser-Plasma Extreme Ultraviolet Source Incorporating a Cryogenic Xe Target, Recent Advances in Nanofabrication Techniques and Applications (chapter 18), Dec. 2, 2011, 353-368, Intech, Japan / online.
(Continued)

*Primary Examiner* — David A Vanore
(74) *Attorney, Agent, or Firm* — Suiter Swantz pc llo

(57) ABSTRACT

The present disclosure is directed to laser produced plasma light sources having a target material, such as Xenon, that is coated on the outer surface of a cylindrically-symmetric element (e.g., drum). Embodiments include a pre-pulsing arrangement which can be optimized to reduce irradiation damage to the drum and a pulse trimming unit which can be employed to reduce irradiation damage to the drum. In addition, an embodiment is disclosed wherein the surface of a cylindrically-symmetric element is formed with a plurality of grooves having a groove depth greater than 1 mm and a focusing unit focusing a laser beam and establishing an irradiation site to produce plasma from the target material, with the irradiation site distanced from a groove surface portion to protect the surface portion from irradiation damage.

25 Claims, 16 Drawing Sheets

(58) Field of Classification Search
CPC ............. G03F 7/70916; G03F 7/70908; G03F 7/70175; G03F 7/20; G03F 7/70166; G03F 7/70841; G03F 7/70858; G03F 7/70891; G03F 7/70933; G03F 7/70983; G01N 21/95; G01N 21/9501; G01N 21/956
USPC ... 250/504 R, 493.1, 428, 372, 492.1, 492.2, 250/358.1, 432 R, 436, 503.1; 378/119, 378/143, 124, 34
See application file for complete search history.

(56) References Cited

U.S. PATENT DOCUMENTS

| | | | | |
|---|---|---|---|---|
| 6,320,937 B1* | 11/2001 | Mochizuki | ............ | H05G 2/003 378/119 |
| 7,095,038 B2* | 8/2006 | Barthod | ................ | B82Y 10/00 250/493.1 |
| 7,233,013 B2* | 6/2007 | Hergenhan | .......... | G03F 7/70841 250/493.1 |
| 7,247,870 B2 | 7/2007 | Ershov | | |
| 7,453,077 B2 | 11/2008 | Bowering | | |
| 7,655,925 B2* | 2/2010 | Bykanov | ............ | G03F 7/70033 250/428 |
| 7,671,349 B2 | 3/2010 | Bykanov | | |
| 7,812,329 B2 | 10/2010 | Bykanov | | |
| 7,928,416 B2 | 4/2011 | Fomenkov | | |
| 8,035,092 B2 | 10/2011 | Ykanov et al. | | |
| 8,198,615 B2 | 6/2012 | Bykanov | | |
| 8,258,485 B2* | 9/2012 | Levesque | ............ | G03F 7/70033 250/432 R |
| 8,723,147 B2 | 5/2014 | Abhari | | |
| 8,963,110 B2* | 2/2015 | Hale | .................... | G01N 21/956 250/492.1 |
| 9,544,984 B2* | 1/2017 | Bykanov | ................ | H05G 2/008 |
| 9,665,017 B2* | 5/2017 | Shu | ..................... | G03F 7/70916 |
| 2008/0179548 A1* | 7/2008 | Bykanov | ................ | B82Y 10/00 250/504 R |
| 2008/0197298 A1 | 8/2008 | Abe et al. | | |
| 2010/0032590 A1 | 11/2010 | Bykanov | | |
| 2012/0050706 A1 | 3/2012 | Levesque et al. | | |
| 2012/0092746 A1* | 4/2012 | Hou | ....................... | H01S 3/076 359/285 |
| 2014/0085724 A1 | 3/2014 | Chilese | | |
| 2014/0166051 A1 | 6/2014 | Umstadter | | |
| 2014/0233005 A1* | 8/2014 | Crouch | .................. | H05G 2/008 355/67 |
| 2014/0239795 A1* | 8/2014 | Kim | ...................... | H01J 61/025 313/111 |
| 2014/0246607 A1 | 9/2014 | Bykanov | | |
| 2014/0306115 A1* | 10/2014 | Kuritsyn | ............ | G02B 27/0006 250/358.1 |
| 2014/0376842 A1 | 12/2014 | Chilese | | |
| 2015/0008335 A1* | 1/2015 | Bykanov | ............. | G03F 7/70033 250/428 |
| 2015/0076359 A1 | 3/2015 | Bykanov | | |
| 2016/0165709 A1* | 6/2016 | Tao | ....................... | H01S 3/0085 250/504 R |
| 2016/0249442 A1* | 8/2016 | Kuritsyn | ................ | H05G 2/003 |
| 2017/0048960 A1* | 2/2017 | Riggs | ..................... | H05G 2/008 |
| 2017/0142817 A1* | 5/2017 | Kuritsyn | ................ | H05G 2/003 |
| 2017/0142818 A1* | 5/2017 | Kuritsyn | ................ | H05G 2/008 |

OTHER PUBLICATIONS

Amano, Laser-Plasma Debris from a Rotating Cryogenic-Solid-Xe Target, Rev Sci. Instrum. 81, 023104, Feb. 5, 2010, online, 7 pages.
Amano, Characterization of a Laser-Plasma Extreme-Ultraviolet Source using a Rotating Cryogenic Xe Target, Appl Phys B 101: 213-219 (2010), online.
Fukugaki, Rotating Cryogenic Drum Supplying Solid Xe Target to Generate Extreme Ultraviolet Radiation, Rev Sci. Instrum. 77, 063114, Jun. 27, 2006, online.
M. Buscher, Production of Hydrogen, Nitrogen and Argon Pellets with the Moscow-Julich Pellet Target, International Journal of Modern Physics E, vol. 18, No. 2 (2009) 505-510, World Scientific Publishing Company, online.

* cited by examiner

PLASMA BASED LIGHT SOURCE HAVING A TARGET MATERIAL COATED ON A CYLINDRICALLY-SYMMETRIC ELEMENT

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled PLASMA BASED LIGHT SOURCE HAVING A TARGET MATERIAL COATED ON A CYLINDRICALLY-SYMMETRIC ELEMENT, naming Alexey Kuritsyn, Ye Liu, and Oleg Khodykin as inventor, filed Nov. 16, 2015, Application Ser. No. 62/255,907.

TECHNICAL FIELD

The present disclosure relates generally to plasma-based light sources for generating light in the vacuum ultraviolet (VUV) range (i.e., light having a wavelength of approximately 100 nm-200 nm), extreme ultraviolet (EUV) range (i.e., light having a wavelength in the range of 10 nm-124 nm and including light having a wavelength of 13.5 nm) and/or soft X-ray range (i.e. light having a wavelength of approximately 0.1 nm-10 nm). Some embodiments described herein are high brightness light sources particularly suitable for use in metrology and/or mask inspection activities (e.g., actinic mask inspection and including blank or patterned mask inspection). More generally, the plasma-based light sources described herein can also be used (directly or with appropriate modification) as so-called high volume manufacturing (HVM) light sources for patterning chips.

BACKGROUND

Plasma-based light sources, such as laser-produced plasma (LPP) sources can be used to generate soft X-ray, extreme ultraviolet (EUV), and/or vacuum ultraviolet (VUV) light for applications such as defect inspection, photolithography, or metrology. In overview, in these plasma light sources, light having the desired wavelength is emitted by plasma formed from a target material having an appropriate line-emitting or band-emitting element, such as Xenon, Tin, Lithium or others. For example, in an LPP source, a target material is irradiated by an excitation source, such as a pulsed laser beam, in a vacuum chamber to produce plasma.

In one arrangement, the target material can be formed on the surface of a drum. After a pulse irradiates a small area of target material at an irradiation site, the drum, which is rotating and/or axially translating, presents a new area of target material to the irradiation site. Each irradiation produces a crater in the layer of target material. These craters can be refilled with a replenishment system to provide a target material delivery system that can, in theory, present target material to the irradiation site indefinitely.

In some applications, Xenon (e.g., in the form of a layer of Xenon ice coated on the surface of a drum) can offer certain advantages when used as a target material. For example, a Xenon target material irradiated by a 1 µm drive laser having a total laser output in the range of a few kilowatts can be used to produce a relatively bright source of EUV light that is particularly suitable for use in a metrology tool or a mask/pellicle inspection tool. For this application, the laser is typically focused to a focal spot that is less than about 100 µm in diameter.

One of the main remaining challenges in the development of these plasma-based light sources is preventing laser-induced damage of the drum, which is covered by Xenon ice, since Xenon ice is semi-transparent to the drive laser light at 1 µm. Although the laser expands while propagating through the Xenon ice, which is typically about 1 mm thick, the laser power density on the ice surface still remains fairly high and can cause drum surface ablation. The particles that are produced on the surface of the drum can lead to Xenon ice stability degradation over time and also slowly propagate through the ice and lead to contamination of optics and other elements in the vacuum chamber.

With the above in mind, Applicants disclose a plasma-based light source having a target material coated on a cylindrically-symmetric element and corresponding methods of use.

SUMMARY

In a first aspect, a device is disclosed herein having a cylindrically-symmetric element rotatable about an axis and having a surface coated with a band of plasma-forming target material having an exposed surface; a system outputting a train of laser beam pulses, each pulse having a leading edge characterized by a rise in laser beam intensity over time; and a pulse trimming unit receiving pulses downstream of the laser system and trimming at least a portion of the leading edge of each pulse to output a trimmed pulse for interaction with the target material to produce plasma.

In one embodiment of this aspect, each pulse has a trailing edge characterized by a decline in laser beam intensity over time and the pulse trimming unit trims at least a portion of the trailing edge of each pulse.

In a particular embodiment, the pulse trimming unit comprises an electro-optical modulator. For example, the electro-optical modulator can have a crystal cell having a crystal cell material selected from the group of crystal cell materials consisting of Potassium Dihydrogen Phosphate (KDP), Beta Barium Borate (BBO), Rubidium Titanyl Phosphate (RTP), Rubidium Titanyl Arsenate (RTA), LiNbO3, or other suitable material.

In an embodiment, the system outputting a train of laser beam pulses includes a cavity dumped laser and in another embodiment, the system outputting a train of laser beam pulses includes a Q-switched laser.

In one particular embodiment of this aspect, the trimmed pulse has a rise time less than 1 ns.

In another aspect, a device is disclosed herein having a cylindrically-symmetric element rotatable about an axis and having a surface coated with a band of plasma-forming target material having an exposed surface and defining a surface normal at an irradiation site on the exposed surface; and a system outputting a laser beam for interaction with the target material to produce plasma, the laser beam traveling along a laser axis at the irradiation site, with the laser axis and surface normal subtending a nonzero angle, a, at the irradiation site.

In an embodiment, the angle, α, is greater than 10 degrees.

In a particular embodiment, the laser axis is aligned normal to an axis that intersects the irradiation site and is aligned parallel to the rotation axis.

In another aspect, a device is disclosed herein having a cylindrically-symmetric element rotatable about an axis and having a surface coated with a band of plasma-forming target material having an exposed surface; a system outputting a laser beam for interaction with the target material to produce plasma; and a focusing unit focusing the laser beam to a waist at a location between the focusing unit and the exposed surface of the plasma-forming target material.

In another aspect, a device is disclosed herein having a cylindrically-symmetric element rotatable about an axis and having a surface coated with a band of plasma-forming target material; and a system irradiating the target material to produce plasma, the system outputting a first laser beam pulse (e.g., a pre-pulse) having an intensity maximum $I_1$, and pulse energy $E_1$, and a second laser beam pulse (e.g., a main pulse) having an intensity maximum $I_2$, and pulse energy $E_2$, with $E_1 < E_2$, and a time delay between $I_1$ and $I_2$ selected to cause the first laser beam pulse to precondition the plasma-forming target material to reduce irradiation damage to the surface of the cylindrically-symmetric element by the second laser beam pulse.

In one embodiment of this aspect, the first laser beam pulse has a longer pulse duration than the second laser beam pulse.

In an embodiment of this aspect, the first laser beam pulse has a shorter wavelength than the second laser beam pulse.

In one particular embodiment of this aspect, the time delay between $I_1$ and $I_2$ is in the range of 10 ns to 10 μs.

In a particular embodiment of this aspect, the intensity maximum, $I_1$, of the first laser beam pulse is greater than the intensity maximum, $I_2$, of the second laser beam pulse ($I_1 > I_2$).

In another aspect, a device is disclosed herein having a cylindrically-symmetric element rotatable about an axis and having a surface coated with a band of plasma-forming target material, the surface formed with a plurality of axially aligned grooves, with each groove established by a pair of fins and each fin having a fin tip, and wherein each groove has a groove depth greater than 1 mm from a fin tip to a groove surface portion; a system outputting a laser beam; and a focusing unit focusing the laser beam and establishing an irradiation site to produce plasma from the target material, the irradiation site distanced from the groove surface portion to protect the surface portion from irradiation damage.

In one embodiment of this aspect, the band of plasma-forming target material has an exposed target material surface distanced from a fin tip by greater than 0.5 mm.

In an embodiment, the groove has a root surface, and a face between the root surface and a fin tip, and wherein at least a portion of the root surface has a surface roughness, SR1, and at least a portion of the face has a surface roughness, SR2, with SR1<SR2.

In one embodiment of this aspect, the device includes an encoder for outputting a signal indicative of a rotational position of the cylindrically-symmetric element and in a particular embodiment, the system outputting a laser beam receives the signal and is configured to use the signal to trigger a pulsed laser output to synchronize laser output with cylindrically-symmetric element rotational position.

In a particular embodiment of this aspect, each groove has a width, normal to the axis, sized to accommodate one irradiation site.

In one particular embodiment, each groove has a width, normal to the axis, sized to accommodate a plurality (e.g., two or more) irradiation sites.

In one particular embodiment, the device includes a drive unit to rotate the cylindrically-symmetric element about the axis and translate the cylindrically-symmetric element, back and forth, along the axis between a first end location and a second end location, the drive unit programmable to vary a rotation velocity at each end location to establish a first set of plasma-forming target material spots for irradiation on a translation from the first end location to the second end location and a second set of plasma-forming target material spots, different from the first set, for irradiation on a translation from the second end location to the first end location.

In some embodiments, a light source as described herein can be incorporated into an inspection system such as a blank or patterned mask inspection system. In an embodiment, for example, an inspection system may include a light source delivering radiation to an intermediate location, an optical system configured to illuminate a sample with the radiation, and a detector configured to receive illumination that is reflected, scattered, or radiated by the sample along an imaging path. The inspection system can also include a computing system in communication with the detector that is configured to locate or measure at least one defect of the sample based upon a signal associated with the detected illumination.

In some embodiments, a light source as described herein can be incorporated into a lithography system. For example, the light source can be used in a lithography system to expose a resist coated wafer with a patterned beam of radiation. In an embodiment, for example, a lithography system may include a light source delivering radiation to an intermediate location, an optical system receiving the radiation and establishing a patterned beam of radiation and an optical system for delivering the patterned beam to a resist coated wafer.

It is to be understood that both the foregoing general description and the following detailed description are exemplary and explanatory only and are not necessarily restrictive of the present disclosure. The accompanying drawings, which are incorporated in and constitute a part of the specification, illustrate the subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Figure 1:
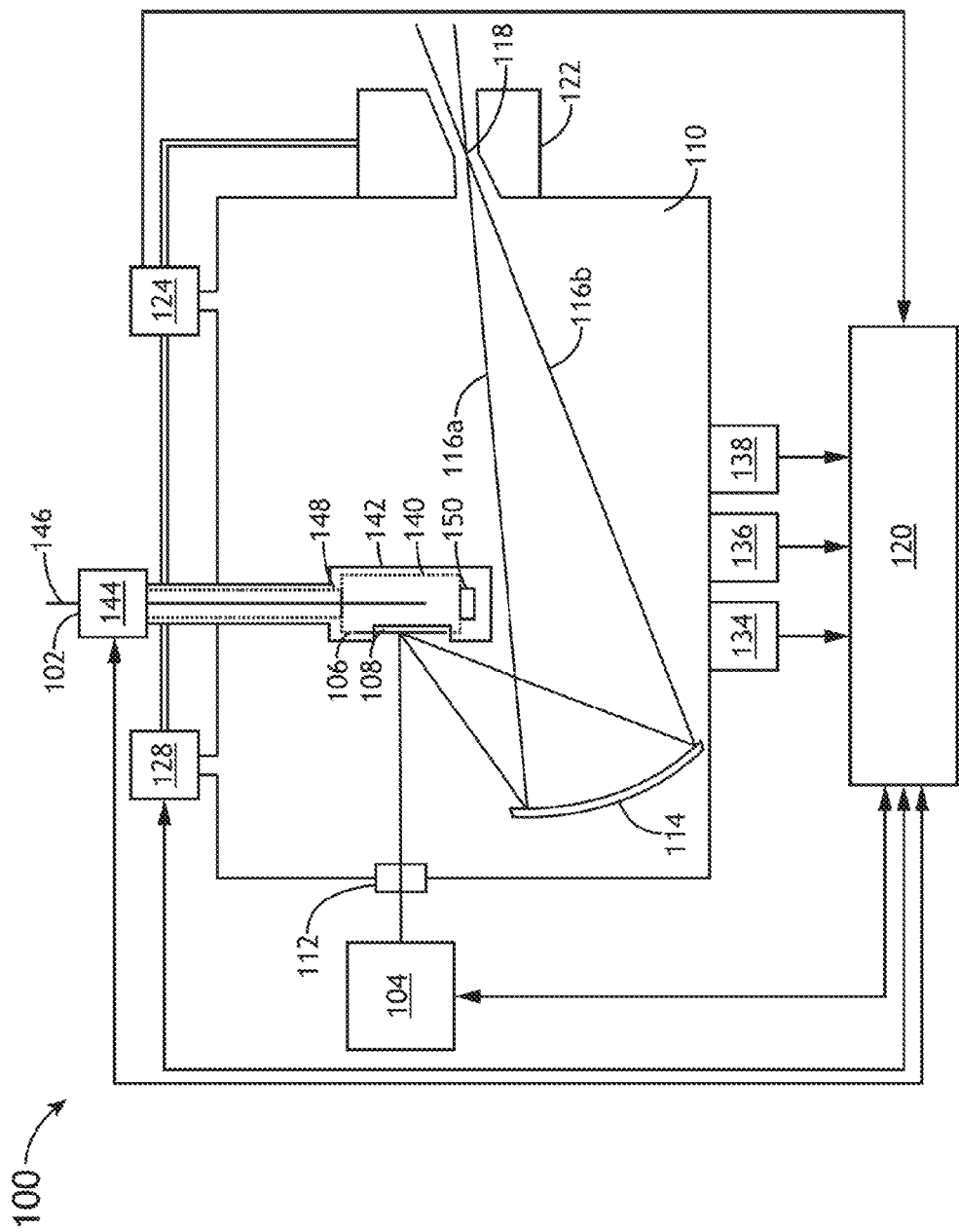
FIG. 1 is a simplified schematic diagram illustrating an LPP light source having a target material coated on a rotatable, cylindrically-symmetric element in accordance with an embodiment of this disclosure.

FIG. 1 shows an embodiment of a light source (generally designated 100) for producing EUV light and a target material delivery system 102. For example, the light source 100 may be configured to produce in-band EUV light (e.g., light having a wavelength of 13.5 nm with 2% bandwidth). As shown, the light source 100 includes an excitation source 104, such as a drive laser, configured to irradiate a target material 106 at an irradiation site 108 to produce an EUV light emitting plasma in a laser produced plasma chamber 110. In some cases, the target material 106 may be irradiated by a first pulse (pre-pulse) followed by a second pulse (main pulse) to produce plasma. As an example, for a light source 100 that is configured for actinic mask inspection activities, an excitation source 104 consisting of a pulsed drive laser having a solid state gain media such as Nd:YAG outputting light at approximately 1 μm and a target material 106 including Xenon may present certain advantages in producing a relatively high brightness EUV light source useful for actinic mask inspection. Other drive lasers having a solid state gain media such as Er:YAG, Yb:YAG, Ti:Sapphire or Nd:Vanadate may also be suitable. Gas-discharge lasers, including excimer lasers, may also be used if they provide sufficient output at the required wavelength. An EUV mask inspection system may only require EUV light in the range of about 10 W, though with high brightness in a small area. In this case, to generate EUV light of sufficient power and brightness for a mask inspection system, total laser output in the range of a few kilowatts may be suitable, which output is focused onto a small target spot, typically less than about 100 μm in diameter. On the other hand, for high volume manufacturing (HVM) activities such as photolithography, an excitation source 104 consisting of a drive laser having a high power gas-discharge $CO_2$ laser system with multiple amplification stages and outputting light at approximately 10.6 μm and a target material 106 including Tin may present certain advantages including the production of in-band EUV light with relatively high power with good conversion efficiency.

Continuing with reference to FIG. 1, for the light source 100, the excitation source 104 can be configured to irradiate the target material 106 at an irradiation site 108 with a focused beam of illumination or a train of light pulses delivered through a laser input window 112. As further shown, some of the light emitted from the irradiation site 108, travels to a collector optic 114 (e.g., near normal incidence mirror) where it is reflected as defined by extreme rays 116a and 116b to an intermediate location 118. The collector optic 114 can be a segment of a prolate spheroid having two focal points having a high-quality polished surface coated with a multilayer mirror (e.g., Mo/Si or NbC/Si) optimized for in-band EUV reflection. In some embodiments, the reflective surface of the collector optic 114 has a surface area in the range of approximately 100 and 10,000 $cm^2$ and may be disposed approximately 0.1 to 2 meters from the irradiation site 108. Those skilled in the art will appreciate that the foregoing ranges are exemplary and that various optics may be used in place of, or in addition to, the prolate spheroid mirror for collecting and directing light to an intermediate location 118 for subsequent delivery to a device utilizing EUV illumination, such as an inspection system or a photolithography system.

For the light source 100, LPP chamber 110 is a low pressure container in which the plasma that serves as the EUV light source is created and the resulting EUV light is collected and focused. EUV light is strongly absorbed by gases, thus, reducing the pressure within LPP chamber 110 reduces the attenuation of the EUV light within the light source 100. Typically, an environment within LPP chamber 110 is maintained at a total pressure of less than 40 mTorr and a partial pressure of Xenon of less than 5 mTorr to allow EUV light to propagate without being substantially absorbed. A buffer gas, such as Hydrogen, Helium, Argon, or other inert gases, may be used within the vacuum chamber.

As further shown in FIG. 1, the EUV beam at intermediate location 118 can be projected into internal focus module 122 which can serve as a dynamic gas lock to preserve the low-pressure environment within LPP chamber 110, and protect the systems that use the resulting EUV light from any debris generated by the plasma creation process.

Light source 100 can also include a gas supply system 124 in communication with control system 120, which can provide protective buffer gas(ses) into LPP chamber 110, can supply buffer gas to protect the dynamic gas lock function of internal focus module 122, and can provide target material such as Xenon (as a gas or liquid) to target material delivery system 102. A vacuum system 128 in communication with control system 120 (e.g., having one or more pumps) can be provided to establish and maintain the low pressure environment of LPP chamber 110 and can provide pumping to target material delivery system 102, if necessary. In some cases, target material and/or buffer gas(ses) recovered by the vacuum system 128 can be recycled.

Continuing with reference to FIG. 1, it can be seen that light source 100 can include a diagnostic tool 134 for imaging the EUV plasma and an EUV power meter 136 can be provided to measure the EUV light power output. A gas monitoring sensor 138 can be provided to measure the temperature and pressure of the gas within LPP chamber 110. All of the foregoing sensors can communicate with the control system 120, which can control real-time data acquisition and analysis, data logging, and real-time control of the various EUV light source sub-systems, including the excitation source 104 and target material delivery system 102.

FIG. 1 also shows that the target material delivery system 102 includes a cylindrically-symmetric element 140. In one embodiment, the rotatable, cylindrically-symmetric element 140 includes a cylinder, as shown in FIG. 1. In other embodiments, the rotatable, cylindrically-symmetric element 140 includes any cylindrically symmetric shape in the art. For example, the rotatable, cylindrically-symmetric element 140 may include, but is not limited to, a cylinder, a cone, a sphere, an ellipsoid and the like. Further, the cylindrically-symmetric element 140 may include a composite shape consisting of two or more shapes. In an embodiment, the rotatable, cylindrically-symmetric element 140 can be cooled and coated with a band of Xenon ice target material 106 that extends, laterally, around the circumference of the cylindrically-symmetric element 140. Those skilled in the art will appreciate that various target materials and deposition techniques may be used without departing from the scope of this disclosure. The target material delivery system 102 can also include a housing 142 overlying and substantially conforming to the surface of the cylindrically-symmetric element 140. The housing 142 can function to protect the band of target material 106 and facilitate the initial generation, maintenance and replenishment of the target material 106 on the surface of the cylindrically-symmetric element 140. As shown, housing 142 is formed with an opening to expose plasma-forming target material 106 for irradiation by a beam from the excitation source 104 to produce plasma at the irradiation site 108. The target material delivery system 102 also includes a drive unit 144 that is attached to the cylindrically-symmetric element 140 by shaft 148. With this arrangement, the drive unit 144 can be programmed to selectively rotate the cylindrically-symmetric element 140 about axis 146 and relative to the stationary housing 142 and translate the cylindrically-symmetric element 140, back and forth, along the axis 146 and relative to the stationary housing 142.

With this arrangement, the band of target material 106 can be moved relative to the drive laser focal spot to sequentially present a series of new target material spots for irradiation. Further details regarding target material support systems having a rotatable cylindrically-symmetric elements are provided in U.S. patent application Ser. No. 15/265,515, titled "Laser Produced Plasma Light Source Having a Target Material Coated on a Cylindrically-Symmetric Element", to Alexey Kuritsyn et al., filed Sep. 14, 2016. U.S. patent application Ser. No. 14/335,442, titled "System And Method For Generation Of Extreme Ultraviolet Light", to Bykanov et al., filed Jul. 18, 2014 and U.S. patent application Ser. No. 14/310,632, titled "Gas Bearing Assembly for an EUV Light Source", to Chilese et al., filed Jun. 20, 2014, the entire contents of each of which are hereby incorporated by reference herein.

Figure 2:
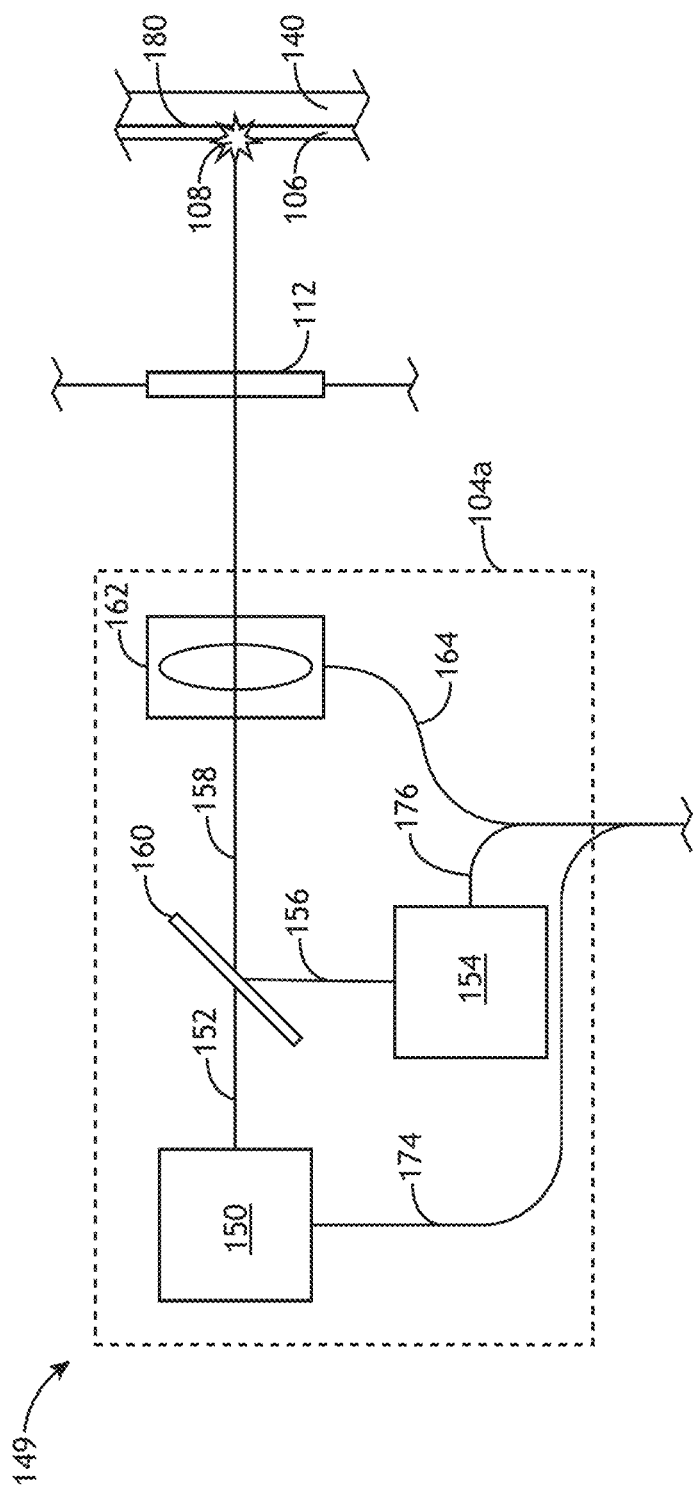
FIG. 2 is a schematic diagram illustrating an excitation source having a pre-pulse laser source and a main pulse laser source.

FIG. 2 shows a system 149 having an excitation source 104a having a laser source 150 producing a first laser beam output 152 and a laser source 154 producing a first laser beam output 156. As shown, outputs 152 and 156 can be combined onto a common beam path 158 by optic 160, which can be, for example, a partially reflective mirror. Other optical arrangements may be used to combine outputs onto a common path. For example, a grating (not shown) may be used if the outputs have different wavelengths. From the optic 160, the combined beam is made incident upon a focusing unit 162 which can have, for example, one or more optics such as a lens(es) or mirror(s). In some cases, the focusing unit 162 can be adjustable, for example, manually or in response to a control signal over line 164, which can be, for example, in communication with the control system 120 shown in FIG. 1. In some cases, the focusing unit 162 can be adjusted to change the size of the focal spot (i.e., waist) and/or to change the position of the focal spot (i.e., waist). With this arrangement, the converging beam exiting the focusing unit 162 can be passed through window 112 and into chamber 110 where it can be used to create plasma from target material 106 on cylindrically-symmetric element 140 at irradiation site 108.

Figure 3:
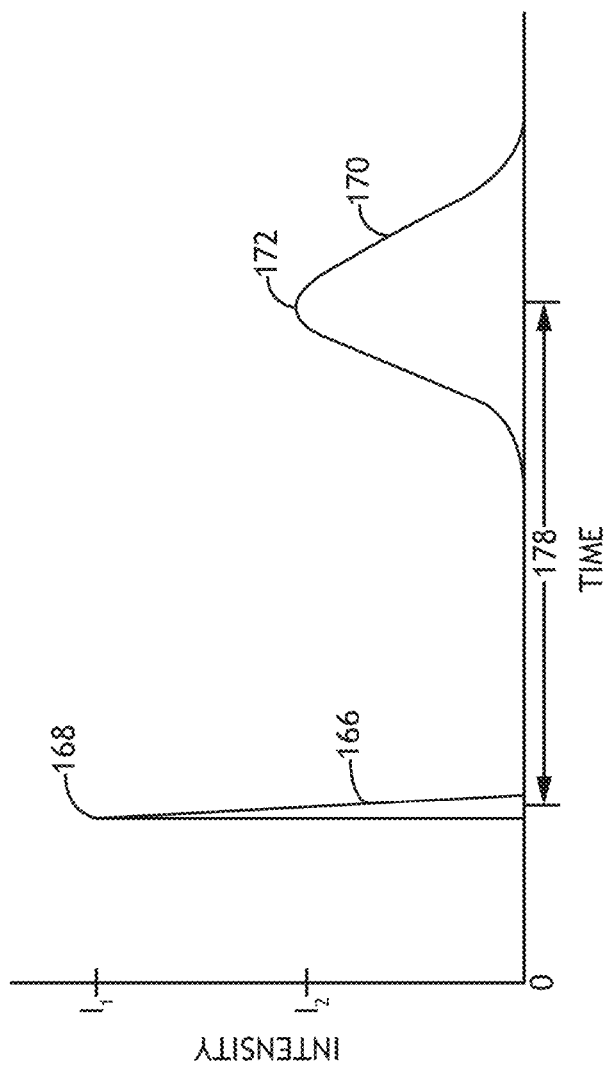
FIG. 3 is a graph of intensity versus time showing a pre-pulse and main pulse.

With cross-reference to FIGS. 2 and 3, it can be seen that the excitation source 104a can be used to produce a first laser beam pulse 166 (e.g., a pre-pulse) having an intensity maximum 168 equal to $I_1$, and pulse energy $E_1$, and a second laser beam pulse 170 (e.g., a main pulse) having an intensity maximum 172 equal to $I_2$, and pulse energy $E_2$, with $E_1 < E_2$. For this expression, pulse energy can be evaluated using, for example, the full width half max (FWHM) technique or some other technique known in the pertinent art. For example, pulse 166 can be output by laser source 154 and pulse 170 can be output by laser source 150. Laser sources 150, 154 can be placed in communication with control system 120 (FIG. 1), via line 174 and line 176, which can control the time in which the laser sources 150, 154 are triggered as well as other process variables. Specifically, the laser sources 150, 154 can be triggered to produce a time delay 178 (e.g., measured between the pulse peaks). With this arrangement, the time delay 178 between pulses 166, 170 can be selected to cause the pulse 166 to precondition the plasma-forming target material 106 (e.g., allow the evolution of a pre-plasma) to reduce, and in some cases eliminate, irradiation damage to the surface 180 of the cylindrically-symmetric element 140 by the pulse 170. For example, the time delay 178 can be in the range of about 10 ns to 10 μs.

In some cases, a pulse 166 having a relatively short duration (~few pico-seconds) and high intensity, but low total energy can be used effectively as a pre-pulse. A pulse 166 with shorter wavelength (i.e., less than 1 μm) can result in higher ionization rate at the same radiation intensity, but short wavelength (green, UV, DUV) lasers may have a higher cost and lower pulse energy. The pre-pulse laser (pulse 166) can precondition the target material 106 (ionize and heat it). By varying the time delay 178 between the pre-pulse (pulse 166) and the main pulse (pulse 170), the target conditions (and plasma parameters), can be optimized to allow for efficient absorption of the main laser pulse. This in turn leads to reduced damage to the cylindrically-symmetric element 140.

Modifications from the description provided above are possible. For example, pulses 166, 170 can be delivered to focal spot(s) along different beam paths. Focusing can be performed before beam combination, for example, using two independently controlled focusing units. Thus, pulses 166, 170 can be delivered to focal spot(s) located at the same or different locations.

Figure 4:
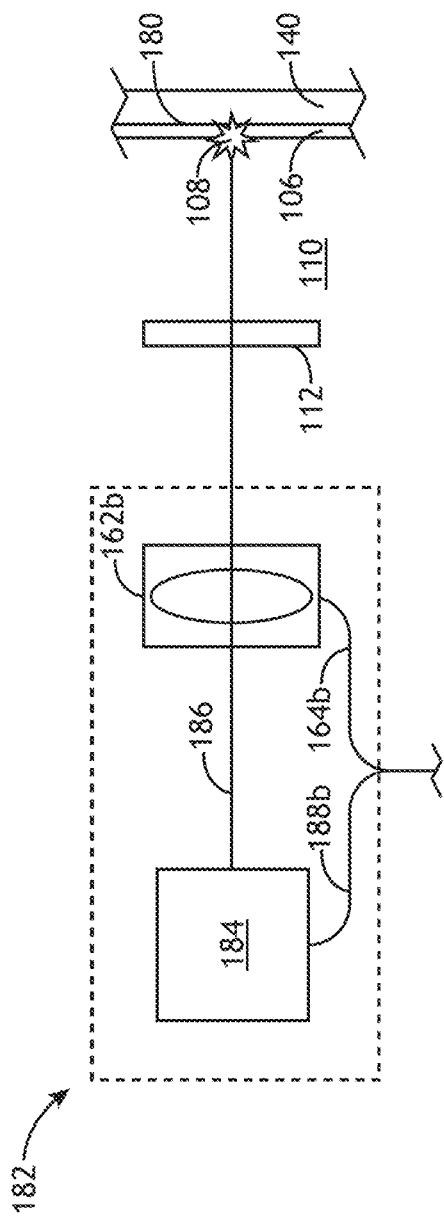
FIG. 4 is a schematic diagram illustrating an excitation source having a single laser source producing a pre-pulse and a main pulse.

FIG. 4 shows a system 182 having an excitation source 104b having a single laser source 184 that can be used to produce the pulses 166, 170 shown in FIG. 3. As shown, output 186 from laser source 184 is made incident upon a focusing unit 162b which can have, for example, one or more optics such as a lens(es) or mirror(s). In some cases, the focusing unit 162b can be adjustable, for example, manually or in response to a control signal over line 164b, which can be, for example, in communication with the control system 120 shown in FIG. 1. In some cases, the focusing unit 162b can be adjusted to change the size of the focal spot (i.e., waist) and/or to change the position of the focal spot (i.e., waist). With this arrangement, the converging beam exiting the focusing unit 162b can be passed through window 112 and into chamber 110 where it can be used to create plasma from target material 106 on cylindrically-symmetric element 140 at irradiation site 108. Laser source 184 can be placed in communication with control system 120 (via line 188b) which can control the time in which the laser source 184 is triggered as well as other process variables to produce the two pulses 166, 170. With this arrangement, the time delay 178 between pulses 166, 170 can be selected to cause the pulse 166 to precondition the plasma-forming target material 106 to reduce, and in some cases eliminate, irradiation damage to the surface 180 of the cylindrically-symmetric element 140 by the pulse 170.

Figure 5:
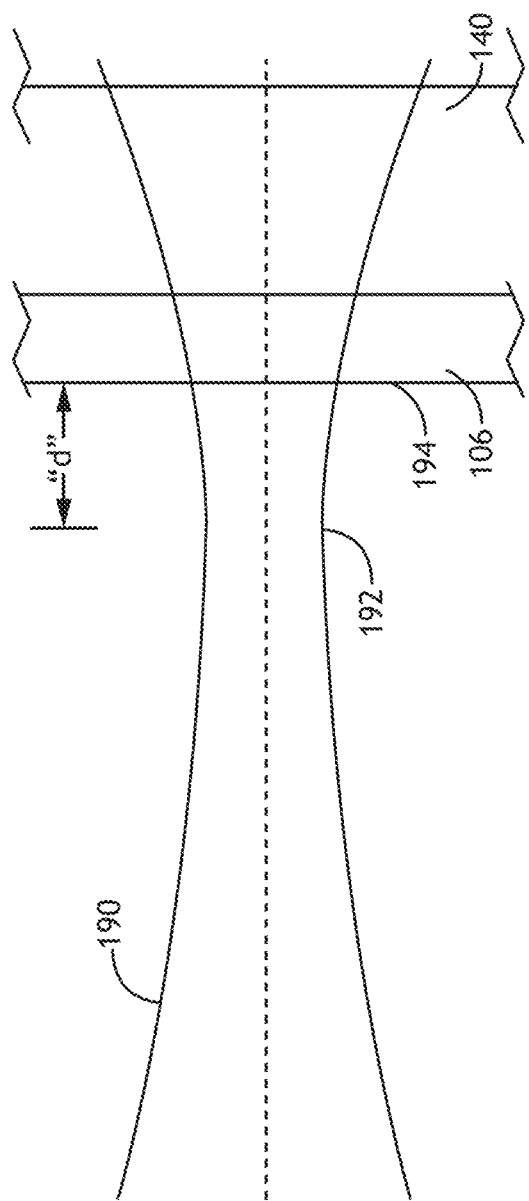
FIG. 5 is a schematic diagram showing a laser beam focused to a waist at a distance from a surface of a target material.

FIG. 5 shows a beam 190 that is focused to a waist 192 (e.g., by a focusing unit such as the focusing unit 162b shown in FIG. 4). As shown, the waist 192 is located at a distance d, from the surface 194 of the target material 106 on cylindrically-symmetric element 140. With this arrangement, the beam intensity at the cylindrically-symmetric element 140 is reduced (relative to a beam that is focused within the target material 106) and, thus this arrangement reduces, and in some cases can eliminate irradiation damage to the cylindrically-symmetric element 140. For example, the waist 192 can be located at a distance d, in the range of about 0 to 10 mm from the surface 194. The embodiment shown in FIG. 5 can be used for the pre-pulse/main-pulse systems shown in FIGS. 2 and 4 and can be used in systems which do not use pre-pulsing. The embodiment shown in FIG. 5 can be used for a trimmed pulse(s) (described below).

Figure 6:
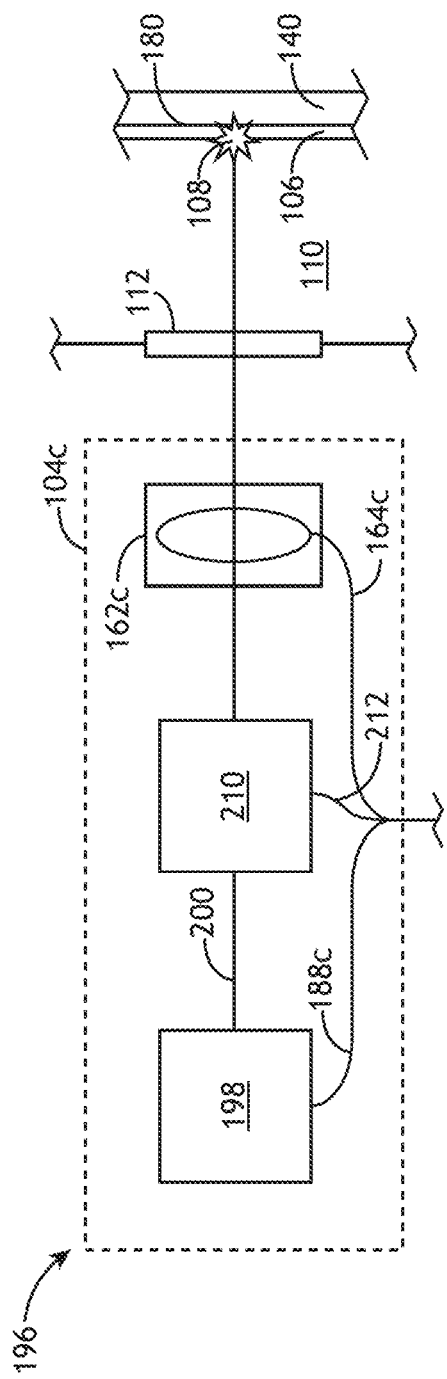
FIG. 6 is a schematic diagram illustrating an excitation source having a pulse trimming unit.
Figure 7:
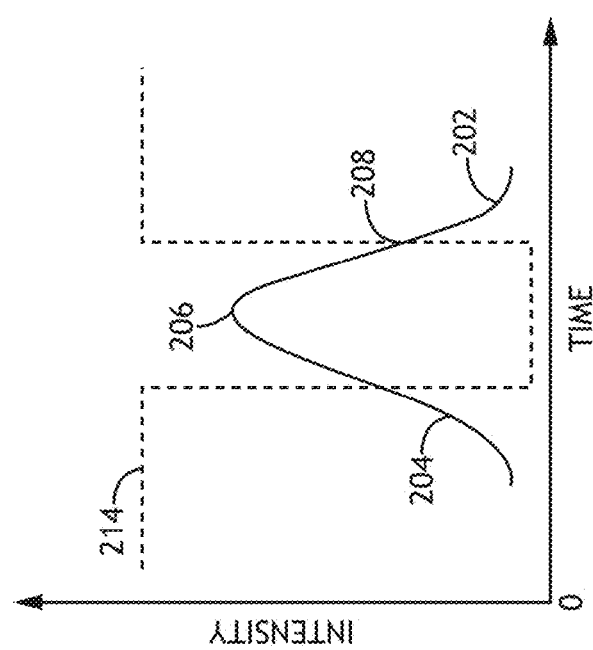
FIG. 7 is a graph of intensity versus time showing a typical pulse that is output by a cavity dumped or Q switched laser source.

FIG. 6 shows a system 196 having an excitation source 104c that includes a laser source 198 producing a laser beam output 200 consisting of a train of laser beam pulses. For example, the laser source 198 can be a cavity dumped laser source or a Q-switched laser source. FIG. 7 shows a representative pulse 202 from the laser beam output 200 (FIG. 6). As shown, the pulse 202 can have a substantially Gaussian distribution of intensity as a function of time including a leading edge 204 characterized by a rise in laser beam intensity over time, a maximum 206, and a trailing edge 208 characterized by a decline in laser beam intensity over time.

As shown in FIG. 6, the laser beam output 200 is passed through a pulse shaping unit 210 which trims a portion of the leading edge 204 and/or trailing edge 208 in response to (e.g., a voltage input over line 212 from the control system 120 as shown in FIG. 1). For example, the pulse shaping unit 210 can include an electro-optical modulator (EOM) having a crystal cell, electrode, and drive circuit. The crystal cell can be made of KDP, BBO, RTP, RTA, LiNbO3, or other suitable material. Transmission of electro-optical modulator is given by $T=\sin^2[(\pi/2)(V/V_{1/2})]$, where V is the voltage applied to the electrodes, and $V_{1/2}$ is the half-wave voltage of crystal. Thus, by controlling the transmission T one can achieve the required pulse shaping function. It is to be appreciated that other arrangements known in the pertinent art for trimming a pulse in response to a control signal may be used in place of the EOM in the pulse shaping unit 210.

Figure 8:
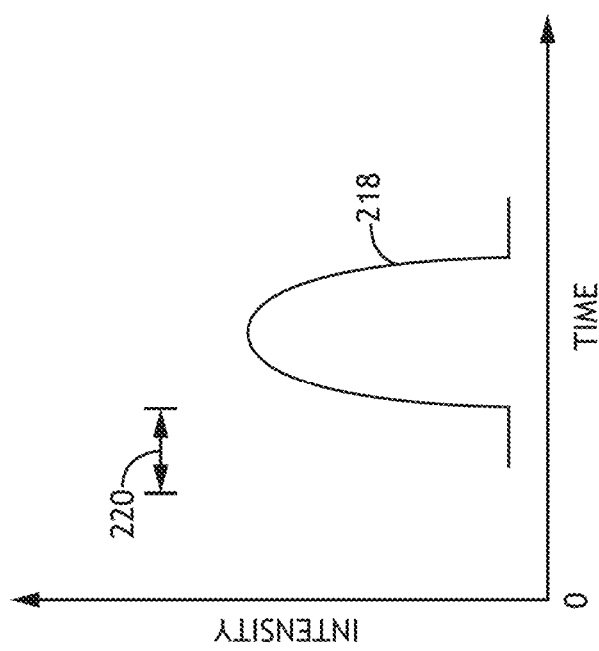
FIG. 8 is a graph of intensity versus time showing the pulse of FIG. 7 after trimming.

FIG. 7 shows a representation of EOM voltage input 214 versus time. It can be seen that the EOM voltage input 214 switches between a high voltage wherein light incident on the pulse shaping unit 210 is trimmed from the pulse shaping unit output and a low voltage wherein light incident on the pulse shaping unit 210 is passed to the pulse shaping unit output. FIG. 8 shows a trimmed pulse 218 from the pulse shaping unit output. As shown, the trimmed pulse 218 can have a rise time 220 less than 1 ns. For example, as shown, the rise time 220 can be measured as the time interval between 10% of the maximum intensity and 90% of the maximum intensity. Shortening the rising leading edge for the laser pulse to <1 ns is useful for drum based LPP EUV sources, since it can be used to achieve better energy absorption and substantially reduce the risk of damaging the drum.

FIG. 6 shows that the pulse shaping unit output can be passed through focusing unit 162c, through window 112 and into chamber 110 where it can be used to create plasma from target material 106 on cylindrically-symmetric element 140 at irradiation site 108. Laser source 198 and focusing unit 162c can be placed in communication with control system 120 (via lines 188c, 164c). With this arrangement, the trimmed pulse can reduce (i.e., relative to an untrimmed pulse), and in some cases eliminate, irradiation damage to the surface 180 of the cylindrically-symmetric element 140. The pulse trimming shown in FIGS. 6-8 can be used for the pre-pulse/main-pulse systems shown in FIGS. 2 and 4, to trim a pre-pulse, main pulse, or both, in systems which focus the beam upstream of the target material surface (FIG. 5), and can be used in systems which do not use pre-pulsing.

Initial ionization of a Xenon target material by a 1 μm drive laser happens due to photo-ionization processes. The energy of a photon is given by $E_{photon}=hc/\lambda$, where h is the Plank constant ($6.62*10^{-34}$ m² kg/s), c is the speed of light, and λ is the wavelength of light. For the laser light with wavelength of 1 μm, the laser photon energy is about 1.2 eV, while the ionization potential of a Xenon atom is 12.13 eV. Therefore, the ionization cannot be done by a single photon. At high radiation intensities, ionization happens due to simultaneous absorption of several photons. This effect is known as multiphoton ionization (MPI). In the MPI process, ionization rate strongly increases with radiation intensity. Also, a laser with shorter wavelength has a higher ionization rate at the same radiation intensity. Moreover, the actual laser intensity will initially be lower at the beginning of the laser pulse than the pulse-averaged value (due to the temporal profile shape of the pulse). This results in even longer MPI ionization times. Clearly, the Xenon target gets only weakly ionized by MPI and laser absorption will be small in the first 'stage' of the laser pulse. As a result, part of the laser energy is not absorbed and will transmit through Xenon ice onto the drum surface. A typical laser temporal pulse shape (e.g., Gaussian) generated from cavity-dumped or Q-switched lasers has a long leading edge rise time and can result in inefficient energy absorption and excessive damage of the drum surface. Therefore, it is desired to have laser pulses with fast rise and fall times, which can be achieved, as described above, by pulse trimming.

Figure 9:
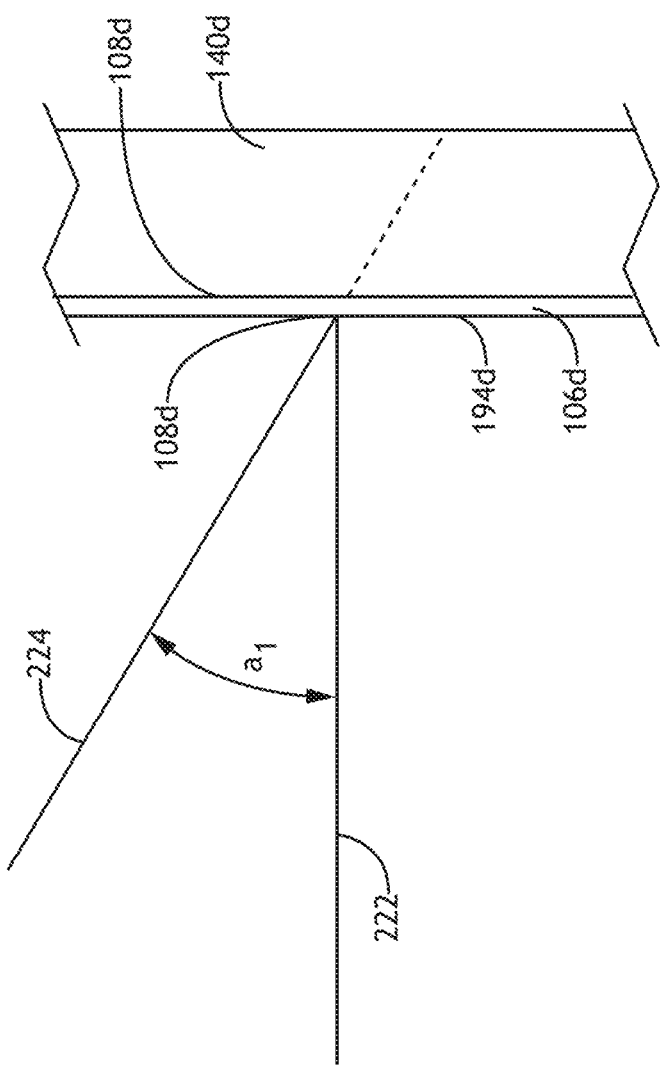
FIG. 9 is a schematic diagram illustrating laser beams that are incident on a target material surface at oblique angles.
Figure 10:
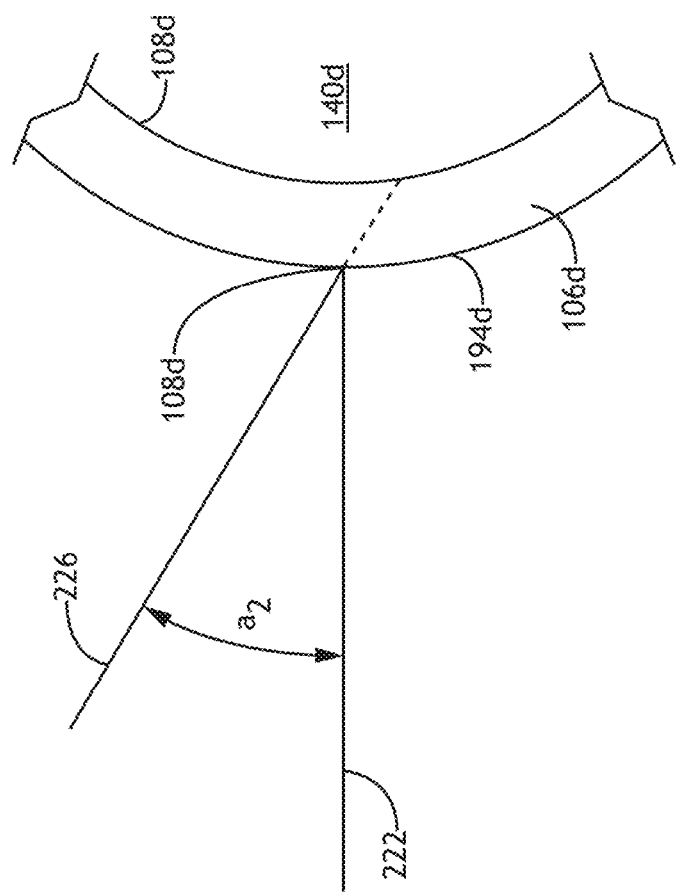
FIG. 10 is a schematic diagram illustrating laser beams that are incident on a target material surface at oblique angles.

FIGS. 9 and 10 show arrangements for reducing, and in some cases eliminating irradiation damage to a cylindrically-symmetric element 140*d* by increasing the distance that the laser beam travels (and expands) through the target material 106*d* before it reaches the surface 180*d* of the cylindrically-symmetric element 140*d* resulting in a reduced laser power density at the surface of the cylindrically-symmetric element 140*d*. As shown, the target material 106*d* has an exposed surface 194*d* having a surface normal 222 at an irradiation site 108*d*. FIG. 9 shows that a laser beam can be delivered to the irradiation site 108*d* along a laser beam axis 224 that establishes a nonzero oblique angle, $\alpha_1$ with the surface normal 222 at the irradiation site 108*d*. For example, an angle, $\alpha_1$, in the range of about 10 to 60 degrees can be used. Also, FIG. 10 shows that a laser beam can be delivered to the irradiation site 108*d* along a laser beam axis 226 that establishes a nonzero oblique angle, $\alpha_2$, with the surface normal 222 at the irradiation site 108*d*. For example, an angle, $\alpha_2$, in the range of about 10 to 60 degrees can be used. It can be seen from FIGS. 9 and 10 that as the angle(s), $\alpha_1$, and/or $\alpha_2$, increase from zero, the distance the beam travels before it reaches the cylindrically-symmetric element 140*d* increases, resulting in reduced irradiation damage (relative to a beam aligned with the surface normal 222 (i.e., $\alpha_1=\alpha_2=$zero degrees). Aligning the laser beam at a non-zero angle to the surface normal as shown in FIGS. 9 and 10 can be used for the pre-pulse/main-pulse systems shown in FIGS. 2 and 4, systems which focus the beam upstream of the target material surface (FIG. 5), trimmed pulse embodiments (FIGS. 6-8) or in systems which do not use pre-pulsing or pulse trimming.

Figure 11:
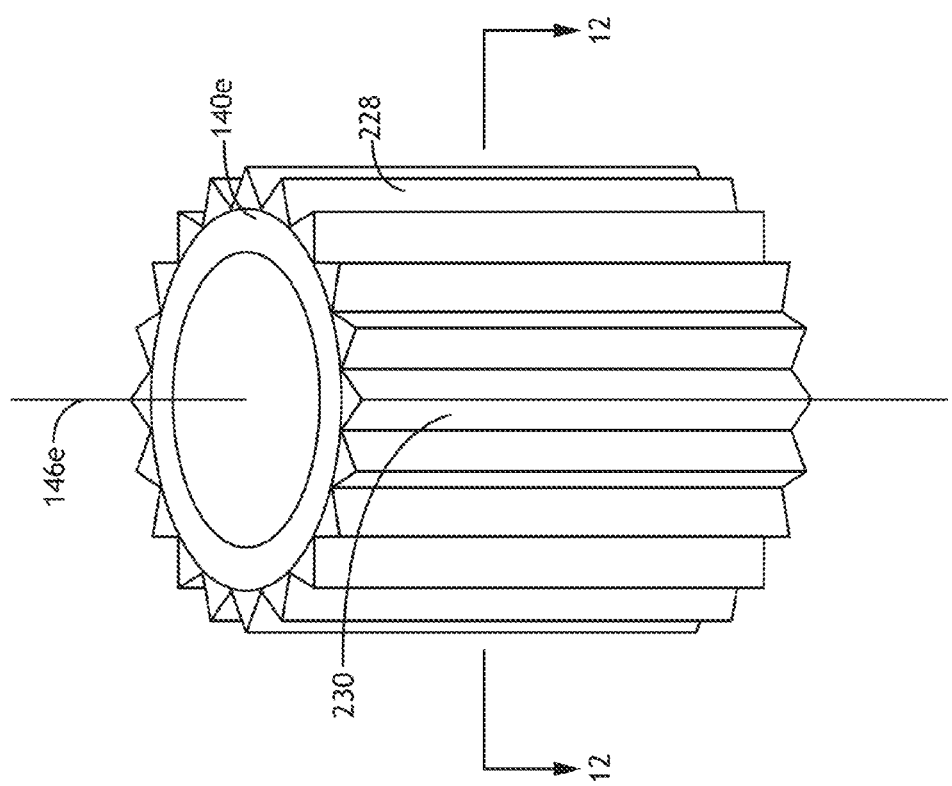
FIG. 11 is a perspective view of a cylindrically-symmetric element having a surface formed with a plurality of grooves.
Figure 12:
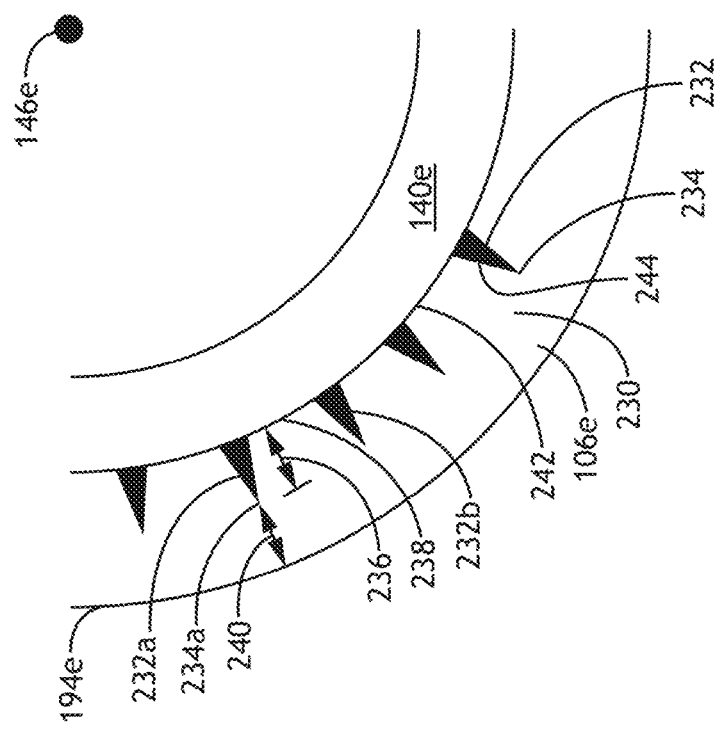
FIG. 12 is a cross section view of the cylindrically-symmetric element shown in FIG. 11 as seen along line 12-12 in FIG. 11 and after coating with a target material.

FIG. 11 shows a cylindrically-symmetric element 140*e* for rotation about an axis 146*e* and having a surface 228 formed with a plurality of axially aligned grooves 230. For example, the grooves 230 can be machined in the surface 228. FIG. 12 shows a portion of the cylindrically-symmetric element 140*e* coated with a layer of target material 106*e*. As shown there, each groove 230 is established by a pair of fins 232 and each fin 232 has a fin tip 234. For example, groove 230*a* is established by fins 232*a*, 232*b* and has a groove depth 236 from a fin tip 234*a* to a groove surface portion 238. Typically, the groove depth 236 of each groove is greater than about 1 mm to reduce, and in some cases eliminate, irradiation damage to the cylindrically-symmetric element 140*e*. Also, the layer of target material 106*e* extends a distance 240 from fin tip 234*a* to the exposed surface 194*e* of the target material 106*e*. Typically, the distance 240 is greater than about 0.5 mm. With this arrangement, laser firing can be synchronized with the rotation of the cylindrically-symmetric element 140*e* to ensure that the laser only irradiates thick pockets of target material (e.g., Xenon ice) therefore reducing damage to the cylindrically-symmetric element 140*e* since the laser beam can expand over a longer distance. The fins 232 between the grooves 230 can help to efficiently cool the surface of the cylindrically-symmetric element 140*e* and preserve Xenon ice stability. In some embodiments, the root surface 242 of each groove 230 can be polished smooth (i.e., having a relatively low surface roughness, SR1), to increase reflectance of the laser light and the face 244, (i.e., the surface between the root surface 242 and a fin tip 234) can be rough (i.e., having a relatively high surface roughness, SR2, with SR1<SR2) or be textured to promote adhesion between the target material 106*e* and the cylindrically-symmetric element 140*e*.

Figure 13:
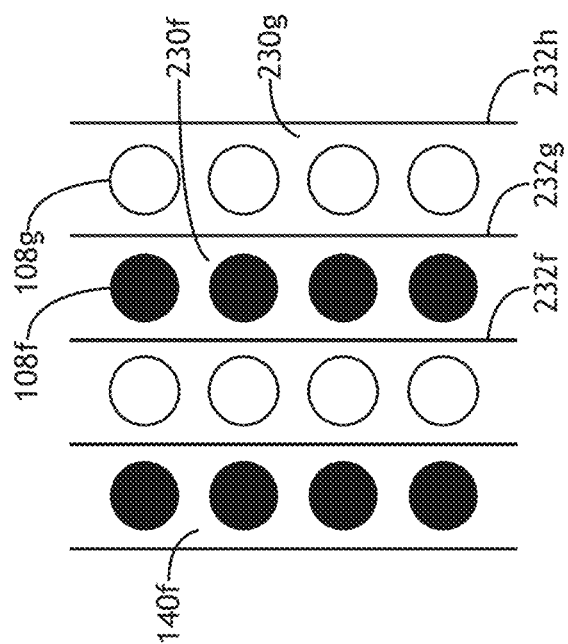
FIG. 13 is a front plan view of a portion of the cylindrically-symmetric element shown in FIG. 11 for an embodiment in which the grooves have a width that is sized to accommodate one irradiation site.

FIG. 13 illustrates an embodiment in which grooves 230*f*, 230*g* established by fins 232*f-h*, have groove widths, normal to the axis 146*e* (FIG. 11), that are sized to accommodate one irradiation site 108*f*, 108*g* (each circle represents the area impacted by an irradiation e.g., a so-called crater produced in the target material). As shown, irradiation sites in adjacent grooves 230*f*, 230*g* can be irradiated in successive axial passes (e.g., irradiation sites 108*f* (dark circles) can be irradiated in an axial movement in a first axial direction of the cylindrically-symmetric element 140*f*, followed by irradiation sites 108*g* (light circles) which can be irradiated in an axial movement in a second axial direction (anti-parallel to the first direction) of the cylindrically-symmetric element 140*f*).

Figure 14:
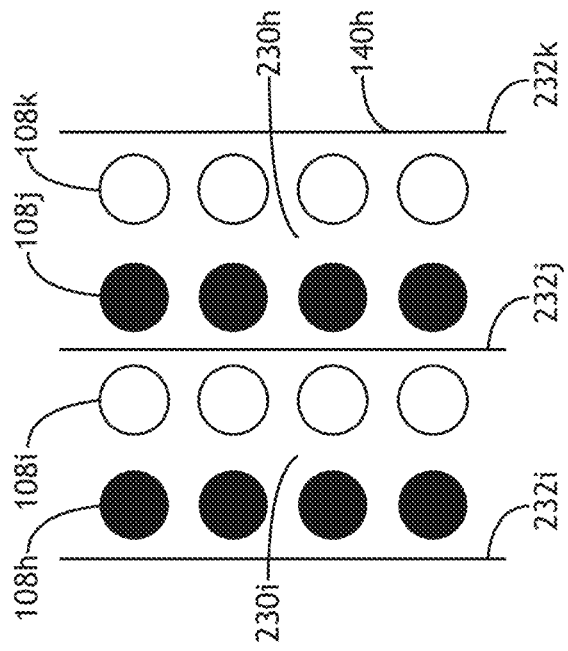
FIG. 14 is a front plan view of a portion of the cylindrically-symmetric element shown in FIG. 11 for an embodiment in which the grooves have a width that is sized to accommodate two irradiation sites.

FIG. 14 illustrates an embodiment in which grooves 230*h*, 230*i* established by fins 232*i-k*, have groove widths, normal to the axis 14*e* (FIG. 11), that are sized to accommodate two irradiation sites 108*h-k* (each circle represents the area impacted by an irradiation, e.g., a so-called crater produced in the target material). As shown, adjacent irradiation sites in each groove, such as groove 230*i* can be irradiated in successive axial passes (e.g., irradiation sites 108*h* (dark circles) can be irradiated in an axial movement in a first axial direction of the cylindrically-symmetric element 140*h*, followed by irradiation sites 108*i* (light circles) which can be irradiated in an axial movement in a second axial direction (anti-parallel to the first direction) of the cylindrically-symmetric element 140*h*. Although embodiments are shown having groove widths sized to accommodate one and two irradiation sites per groove width, it is to be appreciated that a groove sized to accommodate more than two irradiation sites (per groove width) may be used.

To implement the arrangements described above regarding FIGS. 13 and 14, the, the drive unit 144 shown in FIG. 1 can be programmed to vary a rotation velocity of the cylindrically-symmetric element 140 (i.e., accelerate) while irradiation is occurring at each end location (e.g., top and bottom for the alignment shown in FIG. 1) to avoid irradiation of previously irradiated locations (i.e., to ensure that craters do not overlap during continuous operation). With this arrangement, a first set of plasma-forming target material spots (e.g., the dark irradiation locations 108*j* in FIG. 14) can be irradiated on a translation of the cylindrically-symmetric element 140 from the first end location (e.g., top) to the second end location (e.g., bottom) and a second set of plasma-forming target material spots (e.g., the light irradiation locations 108*k* in FIG. 14), can be irradiated on a translation of the cylindrically-symmetric element 140 from the second end (e.g., bottom) location to the first end location (e.g., top).

Figure 15:
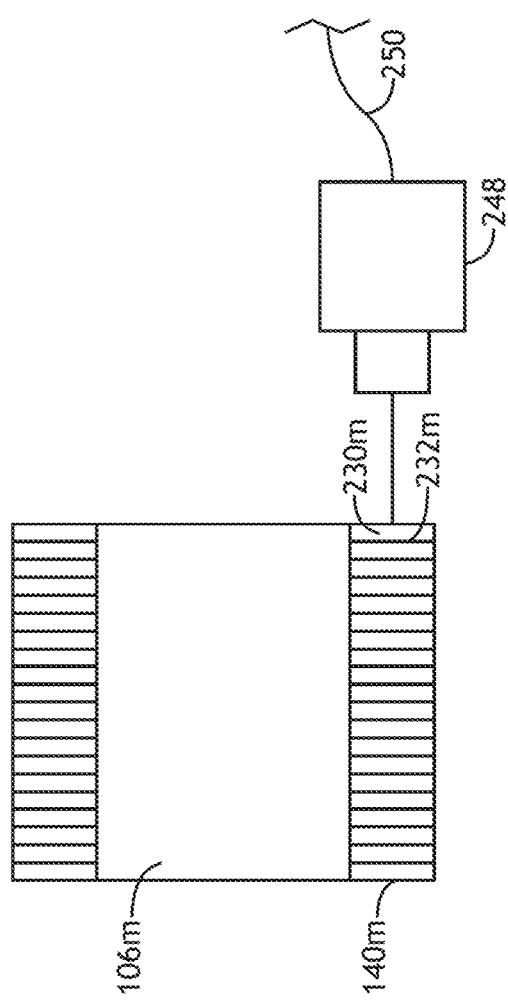
FIG. 15 is a schematic diagram of a system having an encoder to determine the rotational position of a cylindrically-symmetric element.

FIG. 15 shows a system having an encoder 248 for outputting a signal indicative of a rotational position of the cylindrically-symmetric element 140*m* coated with a target material 106*m* via line 250. For example, the encoder 248 can be an optical-based encoder, magnet-based encoder or any other encoder type known in the pertinent art that is suitable for this application. For example, the encoder 248 can be in communication with control system 120 shown in FIG. 1. With this arrangement, the encoder output can be used to trigger a pulsed laser output (e.g., by the excitation source 104 shown in FIG. 1) to synchronize laser output with cylindrically-symmetric element 140*m* rotational position. For example, the encoder 248 may be an optical encoder which accurately registers the position of the grooves 230*m* between the fins 232*m* (e.g., when a groove 230*m* or fin 232*m* passes a preselected location monitored by the encoder 248).

Figure 16:
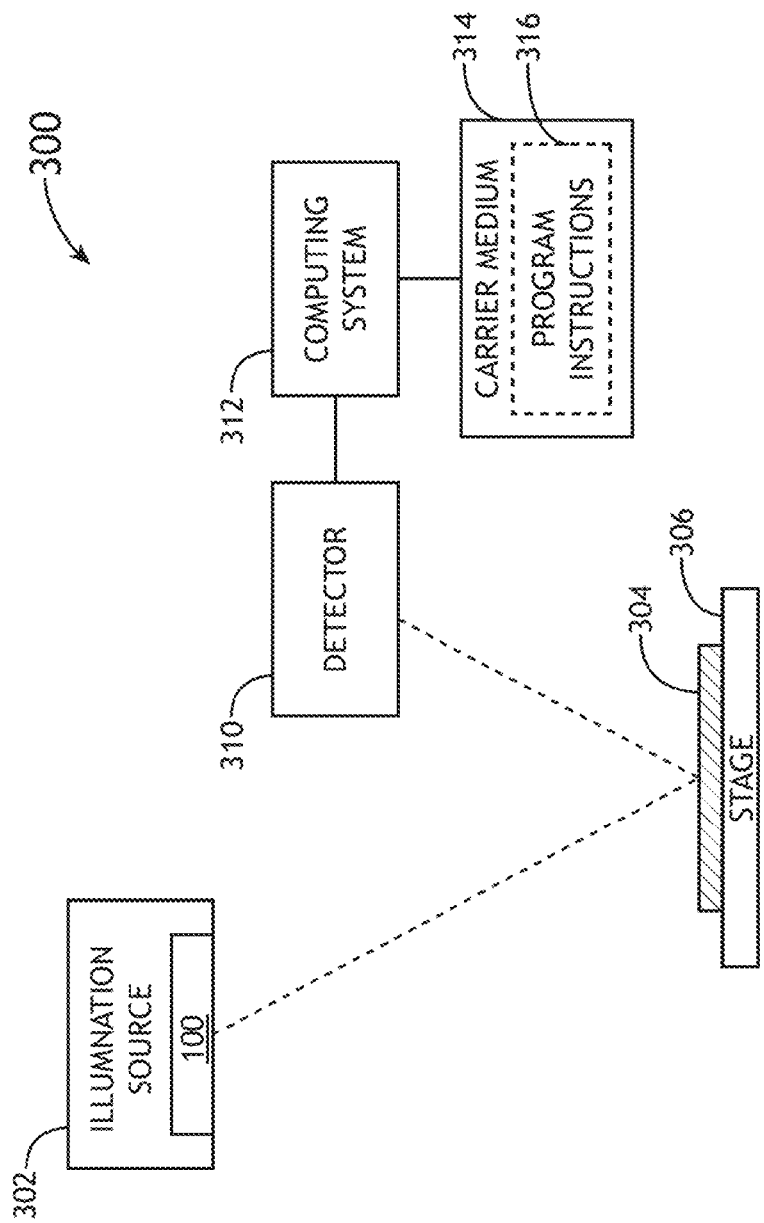
FIG. 16 is a simplified schematic diagram illustrating an inspection system incorporating a light source as disclosed herein.

Light source illumination may be used for semiconductor process applications, such as inspection, photolithography, or metrology. For example, as shown in FIG. 16, an inspection system 300 may include an illumination source 302 incorporating a light source, such as a light source 100 described above having one of the target delivery systems described herein. The inspection system 300 may further include a stage 306 configured to support at least one sample 304, such as a semiconductor wafer or a blank or patterned mask. The illumination source 302 may be configured to illuminate the sample 304 via an illumination path, and illumination that is reflected, scattered, or radiated from the sample 304 may be directed along an imaging path to at least one detector 310 (e.g., camera or array of photo-sensors). A computing system 312 that is communicatively coupled to the detector 310 may be configured to process signals associated with the detected illumination signals to locate and/or measure various attributes of one or more defects of the sample 304 according to an inspection algorithm embedded in program instructions 316 executable by a processor of the computing system 312 from a non-transitory carrier medium 314.

Figure 17:
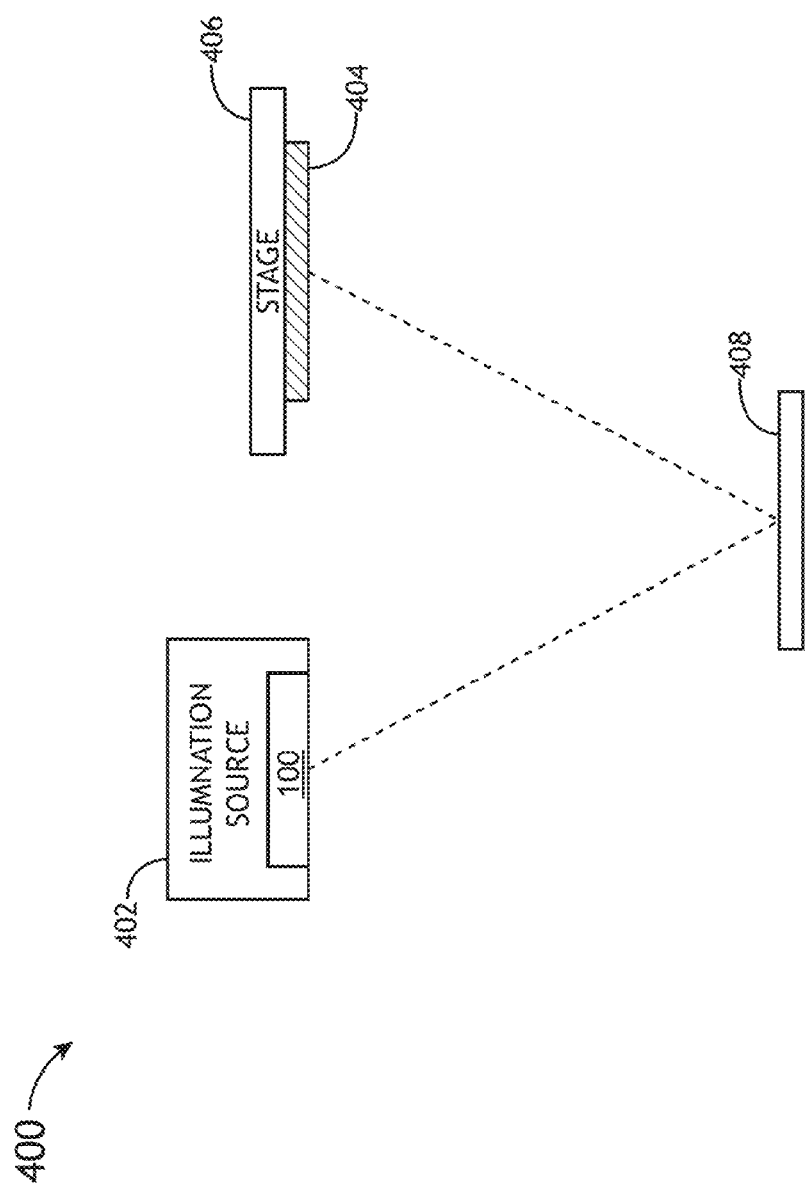
FIG. 17 is a simplified schematic diagram illustrating a lithography system incorporating a light source as disclosed herein.

For further example, FIG. 17 generally illustrates a photolithography system 400 including an illumination source 402 incorporating a light source, such as a light source 100 described above having one of the target delivery systems described herein. The photolithography system may include a stage 406 configured to support at least one substrate 404, such as a semiconductor wafer, for lithography processing. The illumination source 402 may be configured to perform photolithography upon the substrate 404 or a layer disposed upon the substrate 404 with illumination output by the illumination source 402. For example, the output illumination may be directed to a reticle 408 and from the reticle 408 to the substrate 404 to pattern the surface of the substrate 404 or a layer on the substrate 404 in accordance with an illuminated reticle pattern. The exemplary embodiments illustrated in FIGS. 16 and 17 generally depict applications of the light sources described above; however, those skilled in the art will appreciate that the sources can be applied in a variety of contexts without departing from the scope of this disclosure.

Those having skill in the art will further appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. In some embodiments, various steps, functions, and/or operations are carried out by one or more of the following: electronic circuits, logic gates, multiplexers, programmable logic devices, ASICs, analog or digital controls/switches, microcontrollers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a carrier medium. Program instructions implementing methods such as those described herein may be transmitted over or stored on carrier media. A carrier medium may include a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," "temporarily", or for some period of time. For example, the storage medium may be random access memory (RAM), and the results may not necessarily persist indefinitely in the storage medium.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A device comprising:
   a cylindrically-symmetric element rotatable about an axis and having a surface coated with a band of plasma-forming target material having an exposed surface;
   a system outputting a train of laser beam pulses, each pulse having a leading edge characterized by a rise in laser beam intensity over time; and
   a pulse trimming unit receiving pulses downstream of the laser system and trimming at least a portion of the leading edge of each pulse to output a trimmed pulse for interaction with the target material to produce plasma.

2. A device as recited in claim 1 wherein the system for outputting a train of laser beam pulses is configured to generate each pulse to have a trailing edge characterized by a decline in laser beam intensity over time, wherein the pulse trimming unit trims at least a portion of the trailing edge of each pulse.

3. A device as recited in claim 1 wherein the pulse trimming unit comprises an electro-optical modulator.

4. A device as recited in claim 3 wherein the electro-optical modulator has a crystal cell having a crystal cell material selected from the group of crystal cell materials consisting of a KDP, BBO, RTP, RTA, LiNbO3.

5. A device as recited in claim 1 wherein the system outputting a train of laser beam pulses comprises a cavity dumped laser.

6. A device as recited in claim 1 wherein the system outputting a train of laser beam pulses comprises a Q-switched laser.

7. A device as recited in claim 1 wherein the pulse trimming unit is configured to trim at least some of the pulses to have a rise time less than 1 ns.

8. A device comprising:
   a cylindrically-symmetric element rotatable about an axis and having a surface coated with a band of plasma-forming target material having an exposed surface and defining a surface normal at an irradiation site on the exposed surface; and
   a system outputting a laser beam for interaction with the target material to produce plasma, the laser beam traveling along a laser axis at the irradiation site, with the laser axis and surface normal subtending a nonzero angle, a, at the irradiation site.

9. A device as recited in claim 8 wherein the angle, α, is greater than 10 degrees.

10. A device as recited in claim 8 wherein the laser axis is aligned normal to an axis intersecting the irradiation site and aligned parallel to the rotation axis.

11. A device as recited in claim 8 wherein the laser axis is aligned normal to an axis that intersects the irradiation site and is aligned parallel to the rotation axis.

12. A device comprising:
a cylindrically-symmetric element rotatable about an axis and having a surface coated with a band of plasma-forming target material having an exposed surface;
a system outputting a laser beam for interaction with the target material to produce plasma; and
a focusing unit focusing the laser beam to a waist at a location between the focusing unit and the exposed surface of the plasma-forming target material.

13. A device comprising:
a cylindrically-symmetric element rotatable about an axis and having a surface coated with a band of plasma-forming target material; and
a system irradiating the target material to produce plasma, the system outputting a first laser beam pulse having an intensity maximum $I_1$, and pulse energy, $E_1$, and a second laser beam pulse having an intensity maximum $I_2$, and pulse energy, $E_2$, with $E_1<E_2$, and a time delay between $I_1$ and $I_2$ selected to cause the first laser beam pulse to precondition the plasma-forming target material to reduce irradiation damage to the surface of the cylindrically-symmetric element by the second laser beam pulse.

14. A device as recited in claim 13 wherein the system irradiating the target material is configured to output the first laser beam pulse to have a longer pulse duration than the second laser beam pulse.

15. A device as recited in claim 13 wherein the system irradiating the target material is configured to output the first laser beam pulse to a shorter wavelength than the second laser beam pulse.

16. A device as recited in claim 13 wherein the system irradiating the target material is configured to output the first laser beam pulse and the second laser beam pulse, wherein the time delay between $I_1$ and $I_2$ is in the range of 10 ns to 10 μs.

17. A device as recited in claim 13 wherein the system irradiating the target material is configured to output the first laser beam pulse and the second laser beam pulse such that the intensity maximum, $I_1$, of the first laser beam pulse is greater than the intensity maximum, $I_2$, of the second laser beam pulse ($I_1>I_2$).

18. A device comprising:
a cylindrically-symmetric element rotatable about an axis and having a surface coated with a band of plasma-forming target material, the surface formed with a plurality of axially aligned grooves, with each groove established by a pair of fins with each fin having a fin tip, and wherein each groove has a groove depth greater than 1 mm from a fin tip to a groove surface portion;
a system outputting a laser beam; and
a focusing unit focusing the laser beam and establishing an irradiation site to produce plasma from the target material, the irradiation site distanced from the groove surface portion to protect the surface portion from irradiation damage.

19. A device as recited in claim 18 wherein the band of plasma-forming target material has an exposed target material surface distanced from a fin tip by greater than 0.5 mm.

20. A device as recited in claim 18 wherein the groove has a root surface, and a face between the root surface and a fin tip, and wherein at least a portion of the root surface has a surface roughness, SR1, and at least a portion of the face has a surface roughness, SR2, with SR1<SR2.

21. A device as recited in claim 18 further comprising an encoder for outputting a signal indicative of a rotational position of the cylindrically-symmetric element.

22. A device as recited in claim 21 wherein the system outputting a laser beam receives the signal and is further configured to trigger a pulsed laser output to synchronize laser output with cylindrically-symmetric element rotational position based on the received signal.

23. A device as recited in claim 18 further comprising:
a drive unit to rotate the cylindrically-symmetric element about the axis and translate the cylindrically-symmetric element, back and forth, along the axis between a first end location and a second end location, the drive unit programmable to vary a rotation velocity at each end location to establish a first set of plasma-forming target material spots for irradiation on a translation from the first end location to the second end location and a second set of plasma-forming target material spots, different from the first set, for irradiation on a translation from the second end location to the first end location.

24. A device as recited in claim 18 wherein each groove has a width, normal to the axis, sized to accommodate one irradiation site.

25. A device as recited in claim 18 wherein each groove has a width, normal to the axis, sized to accommodate two irradiation sites.

* * * * *